United States Patent [19]

Ascani, Jr. et al.

[11] 4,212,441
[45] Jul. 15, 1980

[54] WING PIVOT ASSEMBLY FOR VARIABLE SWEEP WING AIRCRAFT

[75] Inventors: Leonard A. Ascani, Jr.; Burton C. Rickey, both of Palos Verdes Estates; Merle E. Riggs, Woodland Hills; Andrew R. Shoemaker, La Habra, all of Calif.

[73] Assignee: The United States of America as represented by the Secretary of the Air Force, Washington, D.C.

[21] Appl. No.: 905,063

[22] Filed: May 11, 1978

[51] Int. Cl.² .............................................. B64C 3/40
[52] U.S. Cl. ................................................... 244/46
[58] Field of Search ................................. 244/46, 218

[56] References Cited

U.S. PATENT DOCUMENTS

| B 287,270 | 1/1975 | Peschke | 244/46 |
|---|---|---|---|
| 2,794,608 | 6/1957 | Johnson | 244/46 |
| 2,990,141 | 6/1961 | Wallis | 244/46 |
| 3,227,237 | 1/1966 | Moreno et al. | 180/43 |
| 3,279,721 | 10/1966 | Dethman | 244/46 |
| 3,451,646 | 6/1969 | Aarnaes | 244/46 |
| 3,559,924 | 2/1971 | Jochner | 244/46 |
| 3,565,369 | 2/1971 | Barton et al. | 244/46 |
| 3,606,978 | 9/1971 | Whitener | 244/46 |
| 3,662,462 | 5/1972 | Shiflet | 29/149.5 B |

FOREIGN PATENT DOCUMENTS

| 1531596 | 5/1968 | France | 244/46 |
|---|---|---|---|
| 1183921 | 3/1970 | United Kingdom | 244/46 |

*Primary Examiner*—Barry L. Kelmachter
*Attorney, Agent, or Firm*—Joseph E. Rusz; Jacob N. Erlich

[57] ABSTRACT

A wing pivot assembly for variable sweep wing aircraft for movably securing a wing of the aircraft to the fuselage. The wing pivot assembly has a pivot pin supported by a pair of inboard lugs secured to the fuselage of the aircraft. The wing is, in turn, movably secured to the pivot pin by bearings interposed between the pivot pin and a pair of outboard lugs. In addition an outboard shear fitting located between the wing and the pivot pin movably supports the wing and transfers shear loads to the pivot pin. An inboard shear fitting and anti-rotation device secures and transfers shear loads between the pivot pin and the fuselage. As a result of the above arrangement a multi-load path structure provides for a fail-safe pivot assembly.

7 Claims, 5 Drawing Figures

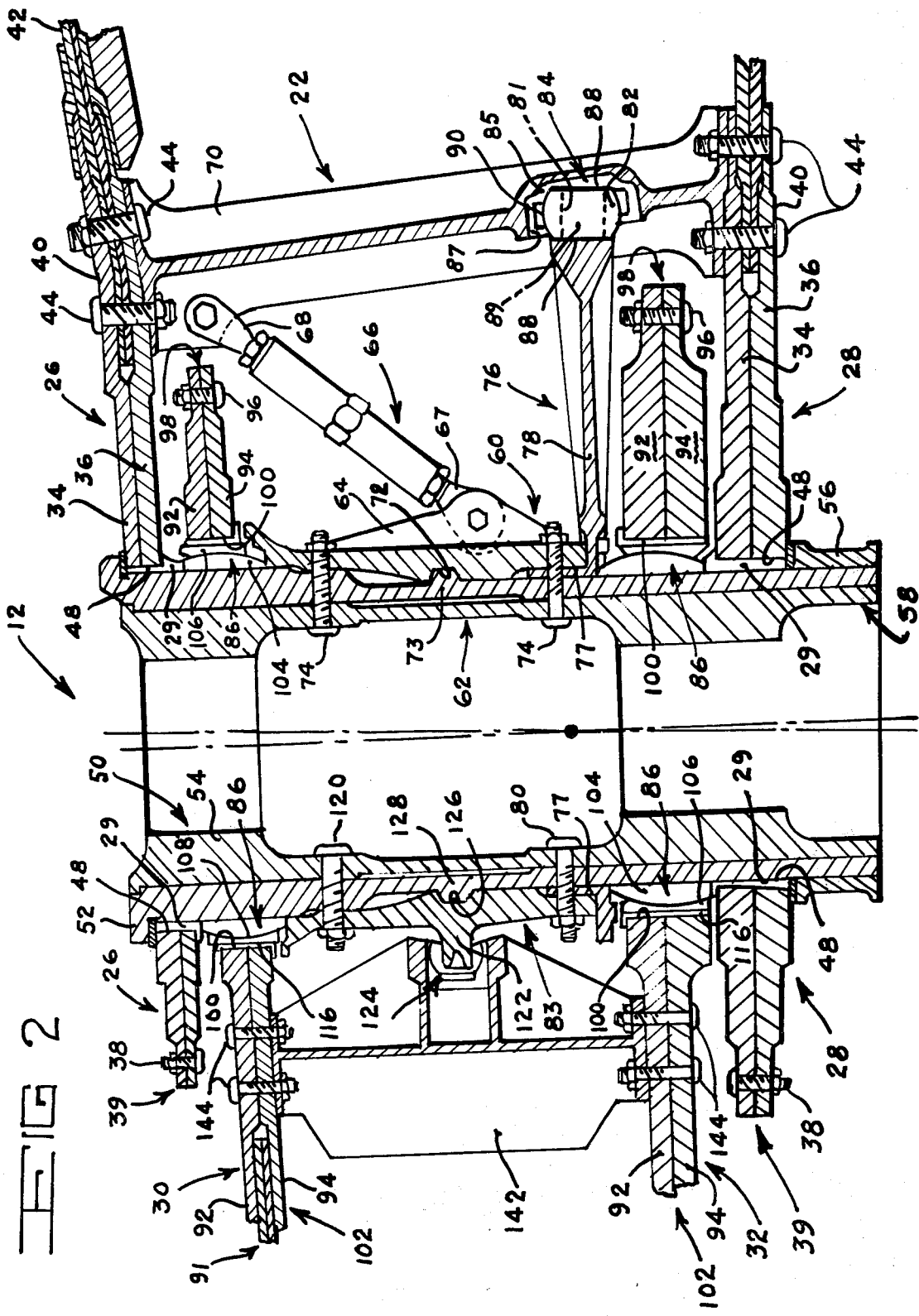

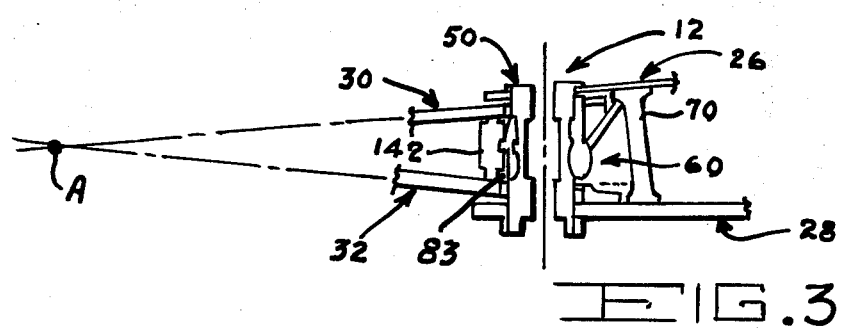
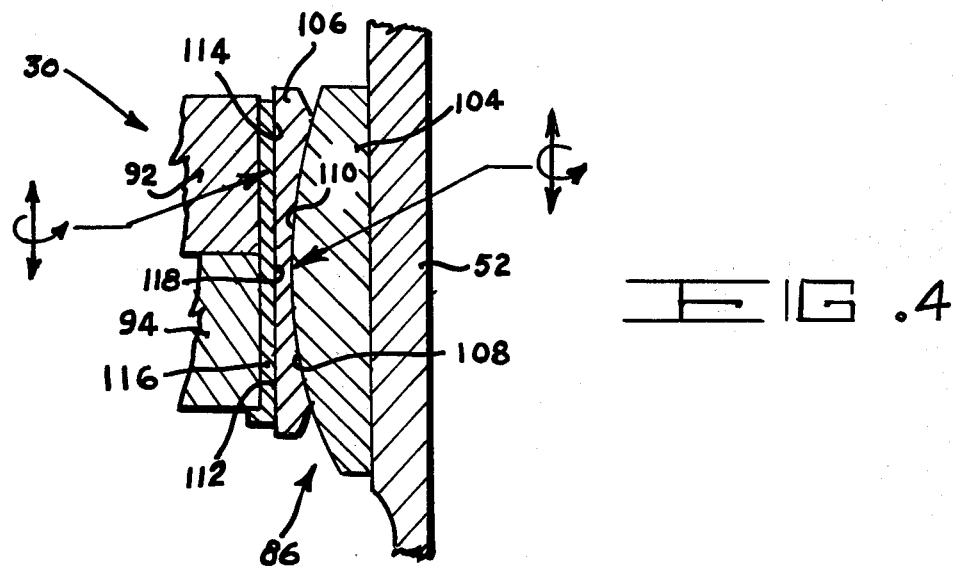
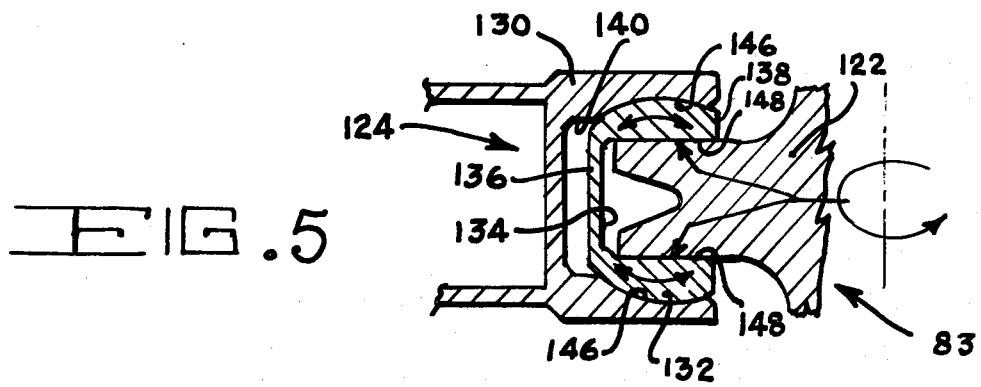

WING PIVOT ASSEMBLY FOR VARIABLE SWEEP WING AIRCRAFT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to variable sweep wing aircraft, and, more particularly, to the wing pivot assembly for joining the outboard movable wing to the fuselage of the aircraft.

It is well known that present conventional wing designs, which are substantially without sweep, give better take-off climb and low speed performance than swept-back wings, and that a high degree of sweep is desirable in the transonic speed range. The problem therefore, has been to get sweep wing designs safely into the air and up to a speed at which the swept design comes into its own; as well as to land such designs at reasonable touchdown speeds.

The sweep wing design encounters difficulties in stall control and poor maximum lift coefficient during low speed operation; whereas, the essentially straight wing is most efficient under these conditions and encounters extremely serious troubles at sub- and transonic speeds where the sweep wing is at its best. The incorporation of a variable sweep wing so that higher degrees of swept angle could be employed for maximum speed performance, and essentially zero degrees of sweep could be employed during very low speed flight results in greatly improved maneuverability characteristics and permits a large range of maneuvering speeds at high altitudes for substantial maneuvering load factors. Comparative design studies for a given range and performance have shown that a fixed sweep wing airplane would have to be much larger and provided with approximately twice the power necessary in the present variably sweep wing design.

Unfortunately the incorporation of the variable sweep wing design within an aircraft results in large loads being applied to the pivot assembly joining the wing to the fuselage of the aircraft. Such forces which concentrate at the wing pivot, if not adequately compensated for, can result in catastrophic consequences to both the aircraft and/or personnel involved in the use of the aircraft. The utilization, however, or more sturdy and complex wing pivot assemblies have also encountered problems in themselves since the reliability of operation of the variable sweep wing feature of the aircraft is substantially affected by an increase in parts and weight at the pivot point thereof. It is therefore essential in variable sweep wing pivot assembly design to produce not only a pivot assembly which is extremely strudy in construction, but also one which provides reliable variable sweep wing operation without an exorbitant increase in expense over prior assemblies.

SUMMARY OF THE INVENTION

The instant invention overcomes the problems heretofore encountered and as set forth in detail hereinabove by providing an operably reliable and structurally sound wing pivot assembly for a variable sweep wing aircraft.

The wing pivot assembly of this invention is located at the end of each movable wing adjacent the fuselage of the variable sweep wing aircraft and joins each outboard movable wing to the carry through structure located in the fuselage of the aircraft. For ease of the understanding of this invention, further description of the wing pivot assembly of this invention will be directed to only one such assembly since the pair of assemblies utilized in variable sweep wing aircraft are identical in construction.

The wing pivot assembly of the instant invention is the primary supporting structure of the wing with respect to the fuselage and as a result thereof carries the wing bending moments and vertical shear loads into the fuselage. The wing pivot assembly of this invention allows variable sweeping of the wings of an aircraft and transferring of the wing loads to the carry through structure through all angles of sweep.

An important aspect of this invention is the fact that this wing pivot arrangement or assembly utilizes the truss concept, wherein the wing lugs are canted to intersect a nominal wing center of pressure, for the 15° wing position, to maximize the percentage of the wing shear load being taken as an axial load in the lugs. This axial load due to shear combines with the wing bending couple load and is carried through the wing pivot by two large double race spherical bearings which are housed in the lugs. A suitable friction reducing liner is bonded to the inner and outer diameter of the outer race. These spherical bearings accommodate structural deflection and manufacturing tolerances. The inner bearing race is free to rotate on the pivot pin and torque induced into the pivot pin is reacted by an anti-rotation fitting which is bolted to the pivot pin and engages the closeout rib of the wing carry through structure.

In conjunction with the above feature, the percentage of vertical shear from the wing which is not reacted as an in-plane load in the lugs due to movement of the center of pressure during wing sweep, is transferred to the pivot pin through a slotted spherical bearing assembly that is bolted to the wing inboard closeout rib and a tongued shear fitting bolted to the pivot pin which engages the slotted spherical bearing. Such shear is then transferred to the wing carry through structure through the inboard shear strut which is bolted to the pivot pin inboard shear fitting and the wing carry through closeout rib.

In addition the inboard lugs are also canted in the airplane side view to provide shear capacity for outboard wing center of pressure shift which occurs for wing sweep angles greater than 15°. The ability of the pivot pin to react to vertical loads makes it readily adaptable for attachment of other structure such as overwing fairings, engine nacelle, etc.

The wing pivot assembly of the instant invention provides fail safe capability within a single integrated structural system, that is, a multi-load path is provided. The pivot pin is of a two piece design and features a "pin within a pin" either of which can carry limit load. The lug plates are also of two piece construction being made up of two plates bolted back to back either of which can carry limit load in tension. Furthermore, the upper and lower spherical bearings are also fail-safe. Two sliding surfaces are provided. If the primary sliding surface (spherical interface between the inner and outer race) should sieze, the coated outside surface of the outer race will slide. The design of the upper and lower spherical bearings also provides capbility for vertical motion in that the teflon lined outer surface of the outer race fits into the concentric, cylindrical, inside surface of the lug bushing. This arrangement which provides the capability for vertical motion is utilized to compensate for deflection under load and also to compensate for tolerance build-up during the manufacturing process.

It is therefore an object of this invention to provide a wing pivot assembly for variable sweep wing aircraft which is structurally sound.

It is another object of this invention to provide a wing pivot assembly for variable sweep wing aircraft which is capable of substantially fail safe operation.

It is still another object of this invention to provide a wing pivot assembly for variable sweep wing aircraft which permits the transferring of wing loads to the carry through structure of the aircraft through all angles of sweep.

It is a further object of this invention to provide a wing pivot assembly for variable sweep wing aircraft which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

FIG. 2 is a side elevational view of the wing pivot assembly of this invention shown partly in cross-section and taken along line II—II of FIG. 1;

FIG. 3 is a side elevational pictorial illustration of the wing pivot assembly of this invention showing the canted relationship of the wing lugs;

FIG. 4 is a detailed side elevational view of the spherical bearing of the wing pivot assembly of this invention shown in cross-section; and FIG. 5 is a detailed side elevational view of the shear bearing of the wing pivot assembly of this invention shown in cross-section.

DETAILED DESCRIPTION OF THE PREFERRED EMBODIMENT

Figure 1:
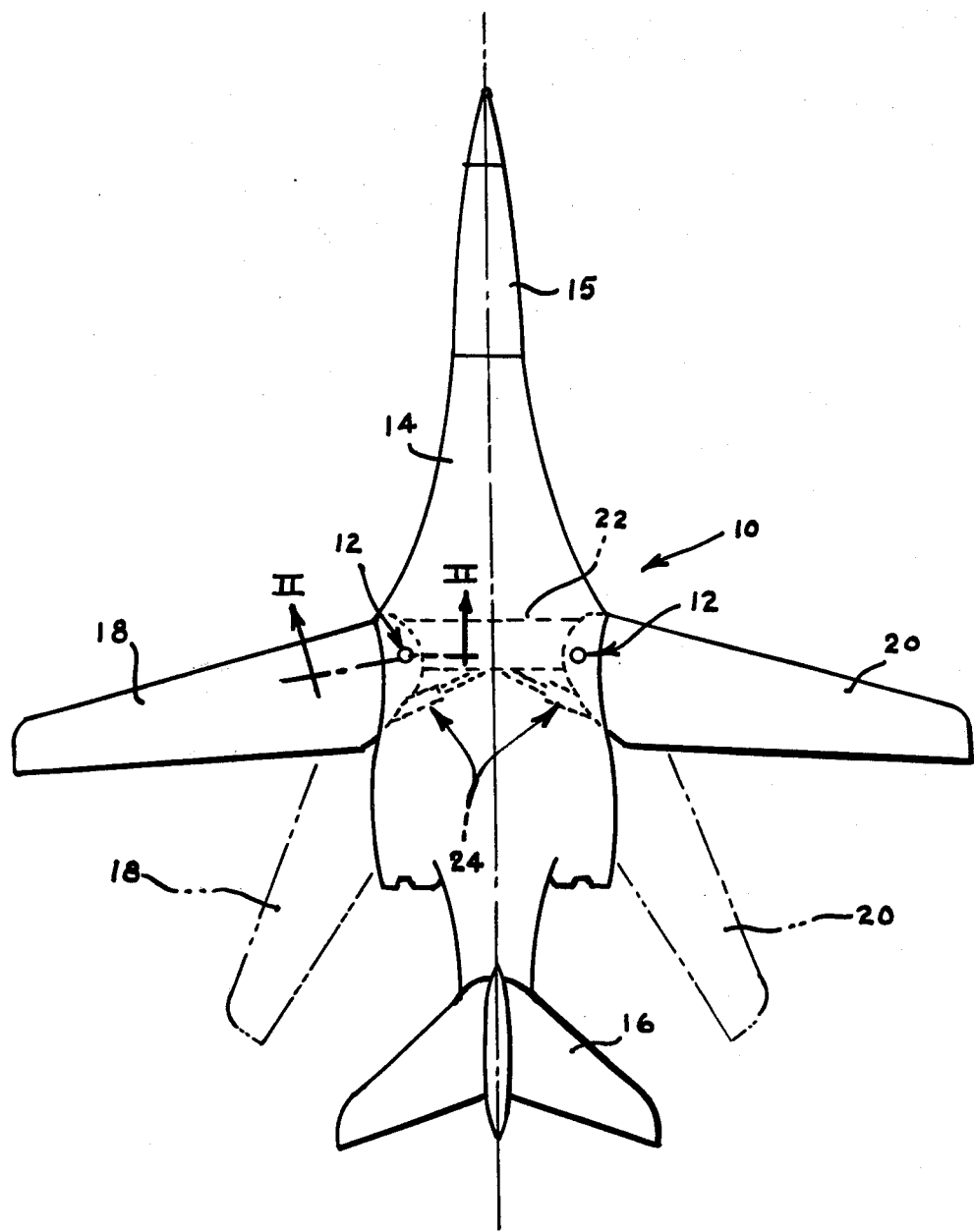
FIG. 1 is a pictorial representation of a variable sweep wing aircraft which incorporates therein the wing pivot assembly of this invention with the wings being shown in two positions of operations.

Reference is now made to FIG. 1 of the drawing which shows in pictorial fashion a variable sweep wing aircraft 10 which incorporates therein the wing pivot assembly 12 of this invention shown in detail in FIG. 2 of the drawing. The variable sweep wing aircraft 10 is made up of a body or fuselage 14 having a nose section 15, a tail section 16 and a pair of movable wings 18 and 20. Wings 18 and 20 are each operatively connected by a separate wing pivot assembly 12 to a conventional aircraft carry through structure or yoke 22 fixedly mounted within the fuselage 14 of aircraft 10.

Any conventional actuating means in the form of, for example, hydraulic actuators 24 are mounted between carry through structure 22 and wings 18 and 20, respectively, in order to move wings 18 and 20 between their open position shown in the heavy lines in FIG. 1 of the drawing and the swept position shown in phantom in the figure. Actuators 24 are generally remotely controlled in any conventional manner by the pilot of aircraft 10 or by signals obtained from, from example, the ground or another airborne body as in the case of a pilotless aircraft. As a result thereof, aircraft 10 is capable of efficient subsonic or supersonic flight.

Reference is now made to FIG. 2 of the drawing which illustrates in detail the wing pivot assembly 12 of the instant invention. It should be noted that in virtually all instances aircraft 10 require two such wing pivot assemblies 12 for mounting wings 18 and 20, respectively, to carry through structure 22 of fuselage 14. However, for purposes of clarity and ease of understanding of this invention only one such wing pivot assembly 12 is shown and described in detail.

A wing pivot assembly 12 is situated at an end of each movable wing 18 and 20, respectively, adjacent fuselage 14 of aircraft 10. The basic supporting elements of wing pivot assembly 12 are in the form of a pair of inboard (upper and lower) lugs 26 and 28, respectively and a pair of outboard (upper and lower) lugs 30 and 32, respectivey.

Inboard upper and lower lugs 26 and 28 are of similar construction and therefore only one lug 26 is described in detail hereinbelow, with like numerals representing similar elements in both lugs 26 and 28, respectively. Upper inboard lug 26 is constructed of two plates 34 and 36 secured together by bolt 38 at one end thereof (outboard end 39) and has the other end thereof constructed of a conventional clevis arrangement 40 or the equivalent. Clevis arrangement 40 securely affixes lug 26 to a wing carry through plank 42 of carry through structure 22. Any suitable securing means such as bolts 44 sandwich carry through plank 42 between plates 34 and 36.

Each plate 34 and 36 of inboard lugs 26 is in the form of a flat plate sculptured to remove excess weight, with outboard end 39 thereof being of a stepped configuration. A large hole 48 is bored within inboard lug 26 in order to accept therein a pivot pin 50 in a manner to be described in detail hereinbelow.

Inboard upper and lower lugs 26 and 28 act together to carry the wing bending moment loads into the wing carry through structure 22. In addition inboard lugs 26 and 28 are designed for fail safe operation since each lug 26 or 28 is constructed of two plates 34 and 36 bolted together, back to back, either plate 34 or 36 capable of carrying the limit load and therefore allowing the system to continue to operate in case of failure of one of the lugs.

Pivot pin 50 is situated within hole 48 within inboard upper and lower lugs 26 and 28 adjacent any suitable upper and lower lug bushings 29. Bushings 29 are circular thin walled cylinders which press fit into holes 48 machined in lugs 26 and 28, respectively, adjacent pivot pin 50. As a result thereof, bushings 29 provide sufficient material which allows final machining and boring of holes 48 to take place on installation when all parts are stacked up for final fit-up. In addition, bushings 29 can be replaced whenever wear or damage requires.

Pivot pin 50 is of a two piece design being made up of outer retaining element 52 and an inner retaining element 54, each of which being preferably of cylindrical configuration and capable of carrying the limit load. Inner element 54 is in mating relationship with the interior of outer element 52, with elements 52 and 54 being fixedly secured together by any suitable retaining member such as pin retainer 56.

Pin retainer 56 is fixedly secured to the lower segment 58 of pivot pin 50 by any conventional securing mechanism such as bolts (not shown). Additionally, pin retainer 56 is a 270° arc of a cylinder attached by bolts to the lower segment 58 of pivot pin 50. Extending aft from retainer pin 56 is a clevis (not shown) for attachment to the nacelle of aircraft 10.

Restricting the undesirable movement of pivot pin 50 is an inboard shear fitting 60. Inboard shear fitting 60 is an elongated structural element bolted to substantially the middle segment 62 of the inboard side of pivot pin 50. The shear fitting 60 is an approximately 107° arc of a cylinder, the inner radius thereof substantially matching and matingly engaging the outer radius of outer element 52 of pivot pin 50. Approximately one third the way up shear fitting 60 is a clevis 64 that engages an inboard shear strut 66.

Strut 66 is in the form of a cylindrical rod which can be adjusted for length and which terminates in fittings 67 and 68 at the end thereof. Fitting 67 attaches at the low inboard side of pivot pin 50 to clevis 64 of shear fitting 60 while fitting 68 attaches to the upper outboard side of a close out rib 70 of the wing carry through structure 22. The inboard shear strut 66 is capable of transferring shear loads from the outboard wing 18 via the inboard shear fitting 60 into the wing carry through structure 22. In addition a groove 72 approximately two fifths up the inner radius of shear fitting 60 accepts a tongue 73 which protrudes from the outer radius of pivot pin 50. The inboard shear fitting 60 transfers the vertical shear load from pivot pin 50 into the inboard shear strut 66. Inboard shear strut 66 forms a trus section with a close out rib 70 of wing carry through structure 22.

Close out rib 70 rigidly supports upper and lower inboard lugs 26 and 28, being affixed therebetween by bolts 44. Any suitable securing means such as bolts 74 attach shear fitting 60 to pivot pin 50. Bolts 74 together with suitable bushings and slots allow shear fitting 60 vertical float and force the tongue and groove arrangement 72, 73 to carry most of the vertical shear load introduced through pivot pin 50.

Positively preventing the rotation of pivot pin 50 is an anti-rotation device 76 formed of a substantially cylindrically-shaped element 77 and an arm 78. Element 77 of anti-rotation device 76 fits, like a collar around the periphery of outer element 52 of pivot pin 50 just below the midpoint thereof. It is bolted directly into pivot pin 50 by bolt 74 as well as bolt 80. Although, for purposes of clarity, only two such bolts are shown in the drawing, additional bolts may be utilized for added strength.

Arm 78 of anti-rotation device 76 extends inboard and terminates in a spherical bearing 82 which nests itself with a bearing retainer member 84 located within close out rib 70 of wing carry through structure 22.

Anti-rotation device 76 prevents pivot pin 50 from rotating when a load is introduced through an outboard shear fitting 83 and a pair of spherical bearing assemblies 86, the full description of which will be set forth hereinbelow. Although anti-rotation device 76 prevents pivot pin 50 from rotating, device 76, concurrently, allows movement of pin 50 in all other directions, i.e., right and left, up and down, and inboard and outboard.

This movement is accomplished by spherical bearing 82 and bearing retainer 84 which although restraining anti-rotation device 76 from rotating in the horizontal plane, allows movement thereof in all other directions. In particular, retainer 84 is made up of a substantially octagonal-shaped outer race 85 mounted within a recess 87 in closeout rib 70. The spherical bearing 82 nests within outer race 85. The spherical ball or bearing 82 has a hole 81 bored through its center and into which an end 89 of anti-rotation device 76 fits. Two flat surfaces 88 are machined normal to hole 81. The resulting bearing 82 is a disc shaped section with a spherical outer surface 90, two flat parallel sides 88 and hole 81 bored through the center. The ball 82 nests in the cavity of outer race 85.

The main structural connection of wings 18 and 20 to pivot pin 50 are in the form of the pair of outboard upper and lower lugs 30 and 32. Since outboard upper and lower lugs 30 and 32 are, as is the case for inboard upper and lower lugs 26 and 28, of substantially identical construction only one lug 30 will be described in detail hereinbelow, with like elements therein being represented by identical numerals.

Outboard upper lug 30 is located and fixedly secured to the inboard end 91 of the outer wing 18 at one end thereof and pivotally engages pivot pin 50 at the other end thereof. As with inboard lugs 26 and 28, outboard lug 30 is constructed of two plates 92 and 94 secured back to back by any suitable securing means such as bolts 96 located at the inboard end 98 of lugs 30 and 32 for fail safe operation.

Outboard lug 30 is a contoured plate sculptured to remove the excess weight. The inboard end 98 thereof being a flat, stepped lug plate with a large hole 100 bored to accept pivot pin 50. The outboard end 102 is contoured to the outer wing Mold Line (shape of the wing in the airstream) and the outboard wing panels of aircraft 10 attach thereto. There are a plurality of shaped cutouts (not shown) for access into wing 18, if desired.

Acting together, outboard upper and lower lugs 30 and 32 carry the bending moment loads of wings 18 and 20 into pivot pin 50. From pivot pin 50 the loads are transferred into the upper and lower inboard lugs 26 and 28 and thence into the wing carry through structure 22.

Located within hole 100 in each upper and lower outboard lug 30 and 32, respectively, is a spherical bearing assembly 86 shown in detail in FIG. 4 of the drawing. Since both upper and lower spherical bearing assemblies 86 are identical in construction, the description set forth hereinbelow will be made with respect to only one such bearing assembly 86.

Spherical bearing assembly 86 fits inside hole 100 and encompasses the periphery of pivot pin 50. Making up spherical bearing assembly 86 are two races 104 and 106 which are essentially two larger circuit rings whose common interface is a teflon lined spherical surface 108. The inner surface 110 of the outer race 106 which is a spherical surface is lined with teflon while the outer surface 112 of outer race 106 is cylindrical and also lined with teflon.

Bearing assemblies transmit wing bending loads from outboard lugs 30 and 32 into pivot pin 50. They permit wings 18 and 20 to sweep fore and aft while transmitting these loads. In addition, bearing assembly 86 provides a fail-safe feature by providing two sliding surfaces 110 and 112 thus providing a back-up sliding surface 112 if the primary sliding surface 110 should fail. The design of the bearing assembly 86 also provides capability for vertical motion. This capability is used to compensate for deflection under load and to compensate for tolerance build-up in the manufacturing process.

The teflon lined outer face 112 of the outer race 106 of bearing assembly 86 fits into the concentric, cylindrical, inside surface 114 of a lug bushing 116. Lug bushing 116 is interposed between outboard lug 30 and bearing assembly 86. It is a circular, thin walled cylinder press fit into outboard lug 30 and dry film lubed on the inner surface 118 thereof. Bushing 116 insulates the primary lug material from wear and damage due to the sliding motion of the outer race 106 of lug bearing assembly 86. The bushing 116 can be easily replaced whenever wear or damage requires. During assembly, material is left on bushing 116 to allow final boring on installation when all parts are stacked up for final fit-up.

As a result thereof, this arrangement provides capability for vertical motion. This capability is used to compensate for deflection under load and also to compensate for tolerance build up during the manufacturing process.

The teflon lined interface 118 between outer race 106 and lug bushing 116 provides the fail-safe redundant system. If the primary sliding surface 108 (spherical interface between the inner and outer races 104 and 106) seizes, outer surface 112 of outer race 106 will slide with respect to lug bushing 116. Thus, bearings 86 allow wing air loads to be transmitted in a straight line into pivot pin 50.

Transferring the vertical shear load from the outer wings 18 and 20 into pivot pin 50 is an outboard vertical shear fitting 83. Outboard shear fitting 83 is an approximately 100° arc of a cylinder juxtaposed anti-rotation device 76 and having its inner radius matched to the outer radius of outer element 52 of pivot pin 50. This outboard shear fitting 83 is secured by any suitable securing means such as bolts 80 and 120 to substantially the middle segment 62 of the outboard side of pivot pin 50.

Approximately mid-way up fitting 83 is a tongue 122 which protrudes outboard and engages a shear bearing 124 clearly shown in FIG. 5 of the drawing. A groove 126 is machined into shear fitting 83 on the inboard side thereof. This groove 126 engages a tongue 128 which protrudes from outer element 52 of pivot pin 50.

Referring to FIG. 5 of the drawing, it is clearly shown that shear bearing 124 is made up of a rectangular housing 130 in which a spherical ball 132 nests. Spherical ball 132 is notched at 134 to receive tongue 122 of outboard shear fitting 83. Two flat surfaces 136 and 138 are machined normal to notch 134. The resulting bearing 124 becomes a "C" section with two flat, machined, parallel sides 136 and 138, respectively, and a notch 134. Spherical ball 132 nests in the cavity 140 of rectangular housing 130 with notch 134 facing away from housing 130.

Shear bearing 124 accepts the vertical shear loads from outboard wing 18, for example, by direct connection thereto through wing inboard close out rib 142 and transfers this load into the outboard shear fitting 83. In addition, wing close out rib 142 is interposed between outboard lugs 30 and 32 and fixedly secured thereto by any suitable securing means such as bolts 144.

Still referring to FIG. 5 of the drawing, shear bearing 124 is shown to ride on tongue 122 protruding from outboard shear fitting 83 and can transfer vertical shear loads throughout all wing sweep positions. Acting together, the two sliding surfaces (spherical surface 146 and notched surface 148) provide freedom of motion in two directions (horizontal and angular up and down). The notched surfaces 148 can maintain their parallelism with tongue 122 of outboard shear fitting 83 and thus their load transfer capabilities are independent of the movements of the outboard wing 18 or 20.

Outboard shear fitting 83 acts together with shear bearing 124 which is nestled in the outer wing inboard close out rib 142 to transfer shear loads while allowing the wing 18 to sweep and while allowing the wing tip up and down movement that results in rotation at pivot pin 50. Bearing 124 is spherical and self aligning. Therefore, it always feeds the vertical shear load into outboard shear fitting 83 in a vertical direction (i.e., no tangential loads).

As illustrated pictorially in FIG. 3 of the drawing, the wing pivot assembly 12 of this invention utilizes the truss concept, wherein the wing lugs 30 and 32 are canted to intersect a nominal wing center of pressure A for the 15° wing position, in order to maximize the percentage of the wing shear load being taken as an axial load in lugs 30 and 32. This axial load due to shear combines with the wing bending couple load and is carried through the wing pivot by two large double race spherical bearing assemblies 86 which are housed in lugs 30 and 32.

In conjunction with the above feature, the percentage of vertical shear from wings 18 and 20 which is not reacted as an in-plane load in lugs 30 and 32 due to movement of the center of pressure during wing sweep, is transferred to pivot pin 50 through a slotted spherical bearing 124 that is bolted to the wing inboard closeout rib 142 and a tongued shear fitting 83 bolted to pivot pin 50 which engages the slotted spherical bearing 124. It is then transferred to the wing carry through structure 22 through inboard shear strut 66 which is bolted to the pivot pin inboard shear fitting 60 and the wing carry through closeout rib 70.

Inboard lugs 30 and 32 are also canted in the airplane side view to provide shear capability for outboard wing center of pressure shift which occurs for wing sweep angles greater than 15°. The ability of pivot pin 50 to react to vertical loads makes it readily adaptable for attachment of other structure such as overwing fairings, engine nacelle, etc., with the resultant wing pivot assembly 12 of this invention providing fail-safe capability.

Although this invention has been described with reference to a particular embodiment, it will be understood to those skilled in the art that this invention is also capable of further and other embodiments within the spirit and scope of the appended claims.

We claim:

1. In a sweep wing aircraft having a fuselage, a pair of movable wings and means for moving said wings to a plurality of positions, the improvement therein residing in a pair of pivot assemblies, each of said pair of pivot assemblies comprising a pivot pin, means operably connected between said fuselage and said pivot pin for mounting said pivot pin adjacent said fuselage, means operably connected between said pivot pin and said fuselage for preventing said pivot pin from rotating, means operably connected between one of said pair of wings and said pivot pin for movably securing said one wing to said pivot pin, means operably connected between said pivot pin and said one wing for movably supporting said one wing with respect to said pivot pin and for transferring vertical shear loads from said one wing to said pivot pin, said means for movably supporting said one wing with respect to said pivot pin being an outboard shear fitting in the form of an approximately 100° arc of a cylinder secured to said pivot pin juxtaposed said means for preventing rotation of said pivot pin and having the inner radius of said rotation prevention means matched to the outer radius of said pivot pin, a tongue protruding from said outboard shear fitting and a shear bearing operably connected to said one wing and movably engaging said tongue on said outboard shear fitting, and means operably connected between said pivot pin and said fuselage for transferring said vertical shear loads from said pivot pin into said fuselage whereby each of said pair of pivot assemblies movably secures one of said pair of wings, respectively, to said fuselage of said aircraft.

2. In a sweep wing aircraft as defined in claim 1 wherein said means for movably securing said one wing to said pivot pin comprises a first and second outboard lug, each of said outboard lugs being secured at one end thereof to said wing and having a hole at the other end thereof, said pivot pin being centrally located within said hole and a bearing assembly interposed between said pivot pin and each of said outboard lugs whereby said outboard lugs are canted to intersect at a nominal wing center of pressure for the 15° wing position.

3. In a sweep wing aircraft as defined in claim 1 wherein said means for transferring said vertical shear loads from said pivot pin into said fuselage comprises an inboard shear fitting in the form of a cylinder of approximately 107° arc, the inner radius of said inboard shear fitting substantially matching and matingly engaging the outer radius of said pivot pin and an adjustable shear strut connected between said inboard shear fitting and said fuselage.

4. In a sweep wing aircraft as defined in claim 1 wherein said means for preventing said pivot pin from rotating comprises a substantially cylindrically-shaped member encompassing and being fixedly secured to said pivot pin and an arm protruding from said cylindrically-shaped member, said arm being secured to said fuselage in such a manner as to allow said pivot pin movement other than said rotating movement.

5. In a sweep wing aircraft as defined in claim 2 wherein said bearing assembly comprises an inner and outer bearing race, said inner and outer race slidably engaging each other and a bushing interposed between said outer race and each of said outboard lugs, said bushing being in slidable engagement with the outer race of said bearing assembly whereby said bearing assembly permits said outboard lug rotational and vertical movement with respect to said pivot pin.

6. In a sweep wing aircraft as defined in claim 1 wherein said pivot pin comprises an inner and outer retaining element secured together, each of which being individually capable of carrying the limit load placed upon said pivot pin.

7. In a sweep wing aircraft as defined in claim 2 wherein said first and second outboard lugs are made of two plates fixedly secured together, each of which being individually capable of carrying the limit load placed upon said lug.

* * * * *